US012792587B1

(12) United States Patent
Oo et al.

(10) Patent No.: US 12,792,587 B1
(45) Date of Patent: Nov. 10, 2026

(54) DEDUPLICATED INDEX CHAINS FOR INCREMENTAL INDEX SEARCHING

(71) Applicant: Amazon Technologies, Inc., Seattle, WA (US)

(72) Inventors: Ian Oo, San Francisco, CA (US); Mark Zhipeng Ma, Alameda, CA (US); Quinn Winter, Mountain View, CA (US); Han Du, Cupertino, CA (US); Daksh Taparia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/253,383

(22) Filed: Jun. 27, 2025

(51) Int. Cl.
*G06F 16/22* (2019.01)
*G06F 16/2458* (2019.01)

(52) U.S. Cl.
CPC ...... *G06F 16/2272* (2019.01); *G06F 16/2477* (2019.01)

(58) Field of Classification Search
CPC ...... G06F 16/22; G06F 16/951; G06F 16/901; G06F 16/31; G06F 16/71; G06F 16/2458; G06F 16/248; G06F 16/903; G06F 16/2453; G06F 16/9038; G06F 16/334; G06F 16/3329; G06F 16/9032; G06F 16/332; G06F 16/245; G06F 16/9537; G06F 11/1446
See application file for complete search history.

(56) References Cited

U.S. PATENT DOCUMENTS

| | | | | |
|---|---|---|---|---|
| 11,461,347 | B1 * | 10/2022 | Das | G06F 16/2433 |
| 12,632,436 | B1 * | 5/2026 | Tracey | G06F 16/2272 |
| 2025/0139109 | A1 * | 5/2025 | Smith | G06F 16/93 |
| 2026/0105101 | A1 * | 4/2026 | Belloni | G06F 16/9024 |

FOREIGN PATENT DOCUMENTS

| | | | | |
|---|---|---|---|---|
| CN | 106844664 A | * | 6/2017 | G06F 16/2455 |

OTHER PUBLICATIONS

U.S. Appl. No. 19/253,169, Efficient Searching of Incremental Indexes for Network-Accessible Data, filed Jun. 27, 2025.

* cited by examiner

*Primary Examiner* — Hicham Skhoun
(74) *Attorney, Agent, or Firm* — Knobbe, Martens, Olson & Bear, LLP

(57) ABSTRACT

Systems and methods are disclosed for efficient searching of incremental. Incremental indexes can store changes to datasets over time rather than fully indexing datasets at multiple points in time, which can save storage space but may lead to search duplication when multiple time periods are searched. Embodiments can address this by deduplicating overlapping index chains that represent a dataset at different points in time. A system can obtain a search query specifying multiple points in time and identify corresponding index chains that share a common base index. The system can generate a deduplicated index chain by combining indexes from multiple chains. Individual indexes within the deduplicated chain can be annotated with time period information indicating which points in time each index should be searched (Continued)

with respect to. This approach can enable a single comprehensive chain to be searched for multiple time periods while ensuring correctness of results.

20 Claims, 10 Drawing Sheets

DEDUPLICATED INDEX CHAINS FOR INCREMENTAL INDEX SEARCHING

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources and data accessible to users of the data center. These resources and data are often configured to implement network-accessible services.

Often, network-accessible services store, generate, or are associated with significant amounts of data. One example is the case of backups, where data of a service is saved periodically for later retrieval. These backups are frequently incremental, such that a backup at a later point in time stores a differential relative to a prior backup. Incremental backups can significantly reduce the amount of data needed to create a backup, particularly when backup frequency is high relative to an amount of data changing between increments.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
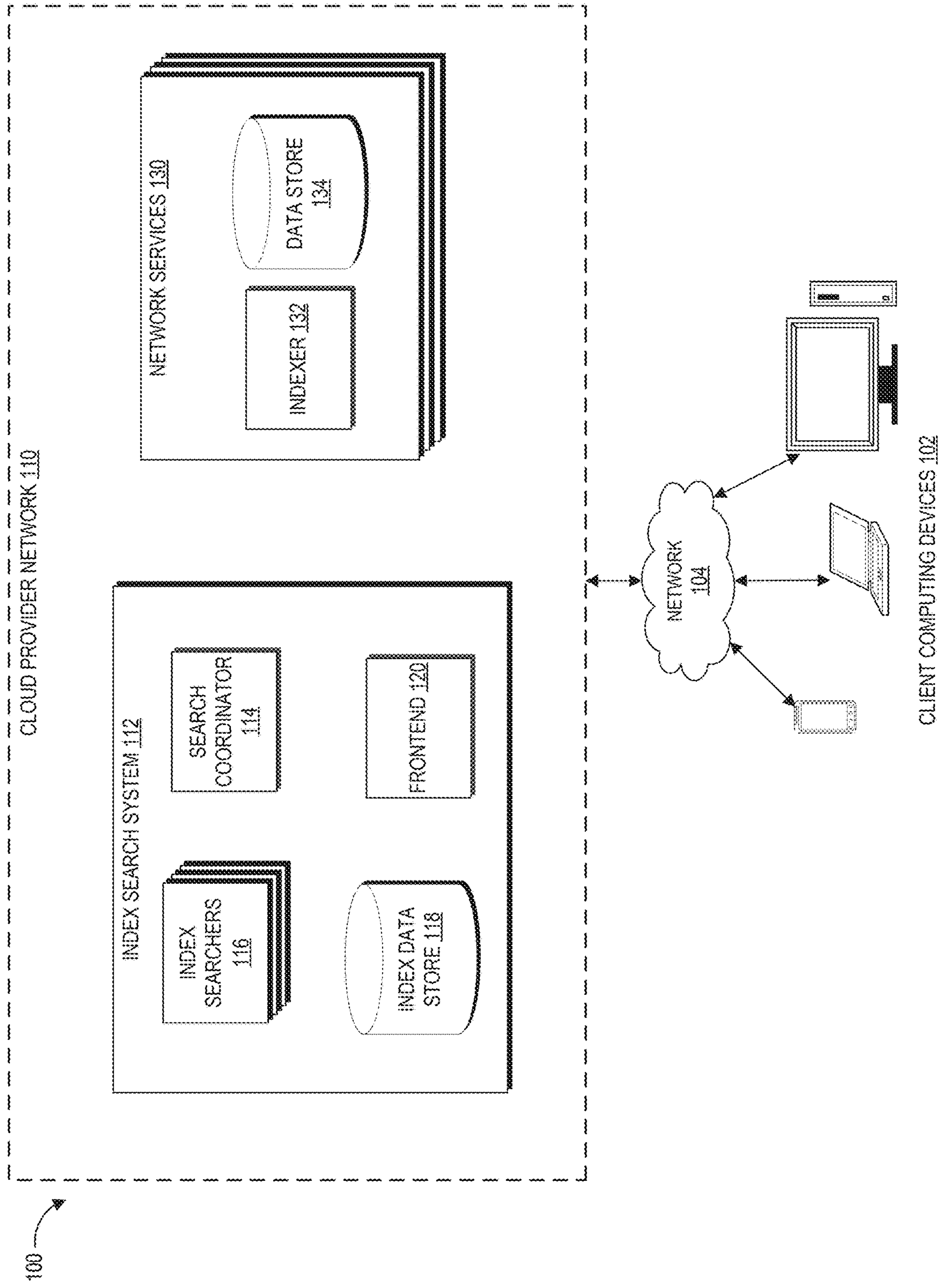
FIG. 1 depicts an example computing environment including a cloud provider environment in which embodiments of the present disclosure can be implemented.

Generally described, aspects of the present disclosure relate to efficient searching of incremental indexes for network-accessible data, such as data of network-accessible services. As used herein, the term "incremental index" refers to indexes that track changes to a set of data over time (e.g., periodically). For example, an incremental index may reflect a backup to a data set at a specific point in time relative to a prior point in time. More specifically, embodiments of the present disclosure relate to efficiently searching large amounts of incremental indexes in an efficient and highly parallelizable manner, enabling rapid searches for even very large indexes (e.g., with billions or trillions of entries) or across multiple indexes. Embodiments of the present disclosure may be particularly suitable for searching indexes of backups of information taken over time. Moreover, by providing a unified format and process for searching indexes across different network-accessible services, embodiments of the present disclosure can provide for unified searching of data across backups of multiple distinct network-accessible services.

Network-accessible services are often associated with large amounts of data. For example, a cloud computing provider may make available to clients a large number of distinct services, all of which produce data during operation. The data of a service may change over time, and versioning or backups may be used to maintain information as to a state of the data at different points in time. Due to this, the amount of data of an individual service can grow quite large, and the amount of data across multiple services may quickly reach extremely high levels. In some cases, services provide indexes to enable more rapid location of relevant data. For example, an index may associate a particular object (e.g., a file, a database entry, an object in an object storage system, etc.) with information regarding that object, thus enabling a user to locate the object based on search parameters identifying the information. However, as the number of indexes grows, searching across indexes can require significant time and computational resources.

One instance where a large number of indexes can be provided is when a service implements incremental indexes. As noted above, an incremental index track changes to a set of data over time. For example, periodic backups of a dataset may be taken, with each index reflecting a state of the dataset at a particular point in time relative to a prior point in time. Illustratively, a first index may represent the dataset at time 1, a second index may represent the dataset at time 2, a third index may represent the dataset at time 3, etc. Rather than provide a full index of the dataset at times 2 and 3, the size of these indexes can be reduced by providing an incremental index, which reflects only changes to the dataset relative to a past time. However, to conduct a search of the data at a point in time then requires searching not only the incremental index, but also any prior indexes (incremental or not) on which the incremental index depends. These dependencies can be referred to as an "index chain"—that is, the set of indexes that collectively represent the data at a given point in time. As the number of increments increases, the index chain grows, such that searching a dataset at an nth increment requires searching through n indexes (e.g., a base non-incremental index and n−1 incremental indexes).

Search complexity further increases as the number of points in time to be searched increases. For example, assume that a dataset is backed up every day for a week, with each index after the first being incremental. Each backup then corresponds to an individual index chain of a length equal to the number of incremental indexes for the backup plus one (the base index). Further, assume that a user wishes to search all backups of the dataset for a relevant data object. A basic approach to such a search would in fact require searching the arithmetic series sum of all backups, or 28 indexes in the case of 7 backups. This is because searching the $7^{th}$ backup requires searching 7 indexes (the last day's index plus all days of the week on which the last day's index depends), searching the $6^{th}$ backup similarly requires searching 6 indexes, etc. Notably, in the basic approach, it would not be correct to simply search the 7 indexes corresponding to the final day, because data may have been modified over the course of the week such that a search of these 7 indexes as a search of the final data would not locate data that, for example, existed at a backup of the $3^{rd}$ day but was later deleted or modified such that it was not responsive to the search by the $7^{th}$ day.

Embodiments of the present disclosure address this problem by efficiently determining a non-overlapping set of indexes to search when conducting searches of datasets over multiple time periods, while accounting for the time periods to be searched. More specifically, a search service as described herein may determine a minimum set of indexes to search when searching datasets at multiple points in time, and may annotate the index indexes (or related search data) with the time periods to be searched, such that modifications over data over time do not prevent location of relevant search results when searching the minimum set of index chains. Illustratively, and continuing the example above, embodiments of the present disclosure may search across 7 days of backups by searching only 7 indexes (one for each day), without requiring individual searches of the index chain for each backup and without overlooking data that might have been modified or deleted during the 7 day period. More specifically, embodiments of the present disclosure can determine a reduced index chain from multiple index chains, which reduced index chain represents the minimum set of indexes representing the multiple index chains. For example, in the instance that backups across a 7 day period are to be searched, the reduced index chain can correspond to 7 indexes: a base index for day one and an incremental index for each additional day. To avoid overlooking objects that are modified during the course of the time period, each index within the reduced index chain can be annotated with the relevant point-in-time with respect to which it should be searched. For example, an index corresponding to the first day may be annotated with an indication that it should be searched with respect to backups for days 1-7, an index corresponding to the second day may be annotated with an indication that it should be searched with respect to backups for days 2-7, etc. Such annotations enable a search system to avoid overlooking objects that would be missed when searching an index solely with respect to a later point in time. For example, assume an object responsive to a search is indicated in an index for the first day, but is deleted on the second day. If the index of the first day were searched solely as part of an index chain for the $2^{nd}$ (or any later) day, the search would not identify the object, as the object is indicated as deleted at the relevant time point of the search. However, because the first day index is annotated to be searched both with respect to the first day and subsequent days, a search process can determine that the object should not be excluded. By virtue of using a reduced index chain (or set of multiple reduced index chains), the total number of indexes to be searched when searching across multiple representations of a data set at multiple points in time can be drastically reduced.

Despite such reductions, some searches may require searching a significant number of indexes. For example, assume an entity is associated with multiple network-based services, each of which is backed up daily and thus associated with an index for each day. Further assume that a user wishes to search data for all searches across all days in a long time period, such as a year or more. In such a case, the number of indexes to search may still be relatively large (e.g., 365 per service multiplied by the number of services). Moreover, each index may be large, as the number of data objects associated with a service may be large (in the thousands, millions, billions, or more). Searching across all indexes may therefore be time intensive, particularly when such searches must account for the particular time period for which an index is searched (e.g., is the index being searched the final index for the time period, such that objects within the index are authoritative for the time period, or is the index being searched as part of a longer chain such that objects within the index may be excluded from search results by virtue of later modification or deletion?).

Embodiments of the present disclosure can provide for efficient and scalable searching across such a large number of indexes by providing for highly parallelized and accurate searching. More specifically, in accordance with embodiments of the present disclosure, a point-in-time index may be divided into two subindexes: an addition subindex and a deletion subindex. The addition subindex illustratively reflects objects added to a dataset relatively to a prior point in time (as well as information regarding such objects that may be, e.g., matched against search criteria). The deletion subindex illustratively reflects data objects removed from a dataset relative to the prior point in time (as well as the information for the objects enabling matching against search criteria). Modification of objects may be reflected in both subindex: as the deletion of the old object and addition of the new object, with the information for the object varying according to the modification. A non-incremental index may be represented solely as an addition subindex, such that the addition subindex reflects the additional of all objects relative to a null set. An incremental index may be represented as both an addition subindex and deletion subindex relative to a past point in time.

By use of addition and deletion indexes, efficient searching is provided across multiple indexes while enabling each index to be considered both as a terminal index (e.g., a final index in a chain) or a non-terminal index. More specifically, when a search is initiated by a user, for each index within an index chain (e.g., a reduced index chain in embodiments utilizing such reduction), the deletion subindex may be searched for matching data objects. If located, an indication of the data object can be stored in a deletion cache, such that the data object is omitted from search results for any point in time at or subsequent to the point in time of the index if located on the basis of any index prior to the point in time of the index. As an example, if a search specifies a period of daily backups for a week, and the object is reflected in the deletion subindex for day 5, the data object may be omitted from search results for day 5 or later if located solely on the basis of an index for days 1-4. This is because the deletion at day 5 indicates the file was deleted, and thus did not "exist" at days 5-7, despite the index chains for days 5-7 including the indexes of days 1-4, where the file may exist. Thereafter, for each index within the index chain, the addition subindex may be searched for matching data objects. Each relevant data object within an addition index can be compared to the deletion cache, and included in search results if not excluded by the deletion cache. Continuing the example above, a matching data object deleted at day 5 may be included in searches for days 1-4, because the object existed at those points in time. Further, a matching data object may be included if added at day 6, even if deleted at day 5, because the object existed at that point in time. However, if the search is of days 5-7 and the object was deleted at day 5 and not otherwise added (except prior to day 5), the object can be excluded from the search.

Notably, the process described above is highly parallelizable, and thus scalable to extremely large datasets. Specifically, so long as the ordering of deletion and addition searches are sequentially, these searches may be parallelized among multiple worker devices (e.g., distinct processes or computing devices) without interdependency among the devices. Accordingly, when for example searching 7 indexes as part of a 7 day search, 7 devices may search each deletion subindex in parallel (e.g., one subindex searched per device) to located deletions responsive to the search. Thereafter, the 7 devices may similarly search each addition subindex in parallel. Accordingly, the time required to conduct a search across multiple time periods may be held constant, regardless of the number of time periods searched, so long as a sufficient number of devices is available. Moreover, parallelization may occur within a subindex. For example, a subindex may be broken into multiple parts that are searched in parallel by multiple devices, enabling reduced and potentially constant search time regardless of index length. In this way, index searches can scale to searches across an extremely high number of time periods and objects.

While embodiments of the present disclosure are discussed with respect to backups, such discussion is not intended to be limited. Rather, embodiments of the present disclosure may facilitate searching across time-based indexes for purposes other than backup. Moreover, while embodiments of the present disclosure are discussed with respect to incremental backups, it should be appreciated that embodiments may facilitate searching across services that provide non-incremental indexes for a given dataset across multiple points in time. Specifically, such non-incremental indexes may be converted to incremental indexes by comparison of the indexes for the same data set at two distinct points in time and generation of addition and deletion subindexes for second and subsequent periods of time based on the comparison, thus facilitating implementation of embodiments of the present disclosure.

As will be appreciated by one of skill in the art in light of the present disclosure, the embodiments disclosed herein improve the ability of computing systems, such as cloud computing systems providing network-accessible services with large-scale data indexing, to efficiently search across incremental indexes representing data at multiple points in time without computational duplication or result inaccuracy. Moreover, the presently disclosed embodiments address technical problems inherent within computing systems; specifically, the exponential growth in computational overhead when searching overlapping index chains for incremental backups, and the inherent trade-off between search efficiency and result accuracy when dealing with time-dependent data modifications and deletions. These technical problems are addressed by the various technical solutions described herein, including the deduplication of overlapping index chains with temporal annotations and the parallelized searching of addition and deletion subindexes to enable highly scalable searches across billions or trillions of indexed entries. The disclosed approach enables constant search time regardless of the number of time periods searched, transforming what would otherwise be an arithmetically increasing computational burden into a parallelizable operation. Thus, the present disclosure represents an improvement on computing systems providing data indexing and search capabilities and computing systems in general.

FIG. 1 depicts an example computing environment 100 including a cloud provider environment 110 in which embodiments of the present disclosure can be implemented. The cloud provider environment 110 can be accessed by client computing devices 102 over a network 104.

A cloud provider network (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider environment 110 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

The cloud provider environment 110 may provide a wide variety of resources. In general, such resources correspond to various configurations of computing devices, including computational resources (e.g., processors, such as central processing units (CPUs), graphical processing units (GPUs), machine learning accelerators, or the like) and storage resources (e.g., random access memory, persistent storage of various configurations, etc.). For example, a cloud provider network may provide resources in the form of virtual machine instances on a compute service, virtual storage drives on a block storage service, and object storage locations object storage service. Some implementations of cloud provider environment 110 can additionally include domain name services ("DNS") services, object storage services, relational database services, and other service configurations (not illustrated). Each service may be implemented by servers having hardware computer memory and/or processors, an operating system that provides executable program instructions for the general administration and operation of that server, and a computer-readable medium storing instructions that, when executed by a processor of the server, allow the server to perform its intended functions. Each service may implement one or more user interfaces (including graphical user interfaces (GUIs), command line interfaces (CLIs), application programming interfaces (APIs)) enabling end users, via user computing devices 102, to access and configure resources provided by the various services.

In one example, the cloud provider environment 110 can provide on-demand, scalable computing environments to users, for example allowing users to have at their disposal scalable "virtual computing devices" via their use of a compute service and block storage service. These virtual computing devices have attributes of a personal computing device including hardware (e.g., various types of processors, local memory, random access memory ("RAM"), hard-disk and/or solid state drive ("SSD") storage, etc.), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider environment 110 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

As illustrated in FIG. 1, the cloud provider environment 110 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein.

Client computing devices 102 can include any network-equipped computing device, for example desktop computers, laptops, smartphones, tablets, e-readers, gaming consoles, and the like. Users can access the cloud provider environment 110 via the network 104 to view or manage their data and computing resources, as well as to use websites and/or applications hosted by the cloud provider environment 110.

In FIG. 1, the cloud provider environment 110 includes one or more network services 130, which correspond to any network-accessible service (e.g., a data storage service, compute service, etc., including object storage, block storage, serverless compute, container-based compute, machine-based compute, analytics services, coordination services, etc.). As shown in FIG. 1, each network service 130 includes a data store 134 that stores data of the service 130 as well as an indexer 132 providing indexes to the data of the data store 134. The data in the data store 134 may be any data associated with the service, including user-data, machine-generated data, logs, metrics, metadata, or the like. For the purposes of description, it is assumed that the data of the data store 134 changes over time, and that multiple versions of a data set are stored within the data store 134 each version corresponding to a distinct point in time. However, in other cases such versioned data may be stored distinctly (e.g., in a backup service configured to store versions of a data set over time). Furthermore, the indexer 132 of FIG. 1 can be configured to provide an index for each point in time that provides information regarding objects in the data store 134 at that point in time, which information is mapped to identifying information of the corresponding object (e.g., an identifier or location of the object). The information for each data object may reflect any attributes or characteristics of the data object facilitating searching for the data object. For example, the information may include an object name, object creator, object creation time, object modification time, object size, object contents (e.g., keywords within a document when the object is a document), or other characteristics, data, or metadata. The particular information associated with each object may vary across network services 130. By specification of criteria for an object in terms of the information in an index, a search may locate objects within the data store 134. For example, an index may indicate that certain objects were created by a given user, such that a search may specify the user in search criteria to locate the objects by use of the index. The indexes created by the indexer 132 are illustratively incremental for a second and subsequent point in time. However, in other embodiments, the indexer 132 does not generate incremental indexes, but incremental indexes may nonetheless be created by comparison of two sequential indexes created by the indexer 132.

The cloud provider environment 110 of FIG. 1 further includes an index search system 112 facilitating efficient and highly parallelizable searching of indexes for network services 130, the index search system 112 including a frontend 120, a search coordinator 114, index searchers 116, and an index store 122. In general, these elements may cooperatively implement aspects of the present disclosure, e.g., ingestion of index data from indexers 132 of network services 130 and implementation of efficient, highly parallelizable searches across the indexes for data objects responsive to the search.

To enable interaction with the index search system 112, the index search system 112 includes a frontend 120 configured to interface with other devices, such as client computing devices 102 and indexers 132, enabling for example indexers 132 to provide indexes to the index search system and the client computing device 102 to request searches of indexes provided by indexers 132 and specify criteria for such searches (e.g., what datasets to search, what attributes or information of data objects should be used as criteria, etc.). For example, the frontend 120 may represent a computing device configured to provide a web-based interface, an application programming interface (API), a command line interface (CLI), a graphical user interface (GUI), or the like to client computing devices 102.

The frontend 120 is illustratively configured to accept indexes created by indexers 132 and store the indexes within an index data store 118, which represents any persistent or substantially persistent data store. Additionally or alternatively, indexes may be stored within network services 130, and the frontend 120 may store in the index data store 118 a reference to indexes stored in the services 130.

The frontend 120 can further obtain searches from client computing devices 102 for data objects referenced within indexes. Illustratively, each search may correspond to one or more datasets and one or more time periods. For example, the search may specify a particular dataset and multiple points in time at which the dataset should be searched. (While each point in time may in fact be representative of a distinct dataset—a backup at a certain point in time—for ease of illustration a given logical dataset, such as a location in a storage system, will be referred to as a single dataset at different points in time.) Each point in time can correspond to one or more indexes. For example, a given point in time may correspond to a non-incremental index identifying data objects of the dataset at that point in time, or may correspond to an incremental index and one or more dependency indexes that collectively identify data objects of the dataset at that point in time.

On receipt of a search, the frontend 120 may interact with the search coordinator 114 to implement the search. More specifically, the search coordinator 114 can represent a computing device configured to identify a minimum set of index chains to search based on the search parameters. As noted above, a given dataset that is represented across multiple points in time can be represented by overlapping index chains, such that independently searching each index chain results in inefficiencies. The search coordinator 114 can therefore be configured to deduplicate overlapping index chains to result in a minimum set of index chains to search. The search coordinator 114 can further augment or annotate the minimum set of index chains with data identifying which points in time each index within each index chain is to be searched. In this manner, an index within an index chain can be searched based on one or more points in time, enabling determination of whether an object located within an index should be returned in response to a search (e.g., based on whether or not the object existed in the data set at a point in time specified in the search).

On determining the set of index chains to be searched, the search coordinator 114 can initiate searches of individual indexes using index searches 116. In some instances, the search coordinator 114 determines a level of parallelization for the search based on various factors, such as a priority of the search, a number of indexes to be searched, a size of the indexes to be searched, a number of index searchers 116 available, or resources of index searchers 116 available. Because individual indexes may be stored as multiple parts or otherwise divided into parallel portions, the level of parallelization is effectively infinite, and may thus vary between zero (no parallelization) and n, where n is the number of indexes to be searched multiplied by the number of parts each index is broken into. For ease of illustratively, searches will be described as parallelized based on a number of indexes; however, it should be understood that indexes may be subdivided and thus parallelization increased.

For each index to be searched, the search coordinator 114 then initiates a search via index searchers 116. For example, the search coordinator 114 can pass to each index searcher 116 an indication of an index to be searched, time periods for which the index is to be searched, and search criteria. The index searchers 116 can then search their respective indexes based on the time periods and criteria. As described in more detail below, such searching can include coordination among index searchers 116 such that all deletion subindex for a given index chain are searched prior to all addition subindexes for the index chain, to ensure correctness of the search results. However, coordination may not otherwise be required among index searches 116. Search results located by the index searches 116 can then be returned to a requesting client computing device 102. In some instances, search results are streamed to client computing devices 102, such that they are available as determined by the index searches 116. In other instances, search results are stored in a storage location on the index search system 112 accessible to a client computing device 102, such that the client computing device 102 can access search results after they are stored in the storage location (which may occur, e.g. continuously as results are identified).

While searches are discussed herein as parallelizable, searches may additionally or alternatively occur sequentially. For example, where two indexes are not part of an index chain, a first search may occur with respect to a first index and a second search of the second index may occur sequentially to the first search. Each index search may itself be highly parallelizable. This approach may enable, for example, results from the first index to be identified rapidly while the search of the second index continues. Sequential searches may also occur with respect to a single index or with respect to two indexes forming a part of a single index chain. In some cases, such sequential searching may delay results to the client computing device 102 (e.g., because all deletion subindexes are to be searched prior to all addition subindexes); however, sequential searching may reduce the point-in-time computational resource requirements to conduct a search.

In one instance, each of the elements of FIG. 1 is a distinct computing device configured with computer-executable code to carry out the functionality described herein. In another instance, one or more elements of FIG. 1 are implemented as code on a shared computing device. In still another instance, one or more elements of FIG. 1 are implemented as a configuration of a network service 130 that itself includes computing devices configured to implemented desired functionality. For example, the frontend 120, search coordinator 114, or index searches 116 may implemented as code executed on a serverless code execution service, a state machine service, or the like, which services include computing devices configured to execute the code to implement the functionality described herein.

Figure 2:
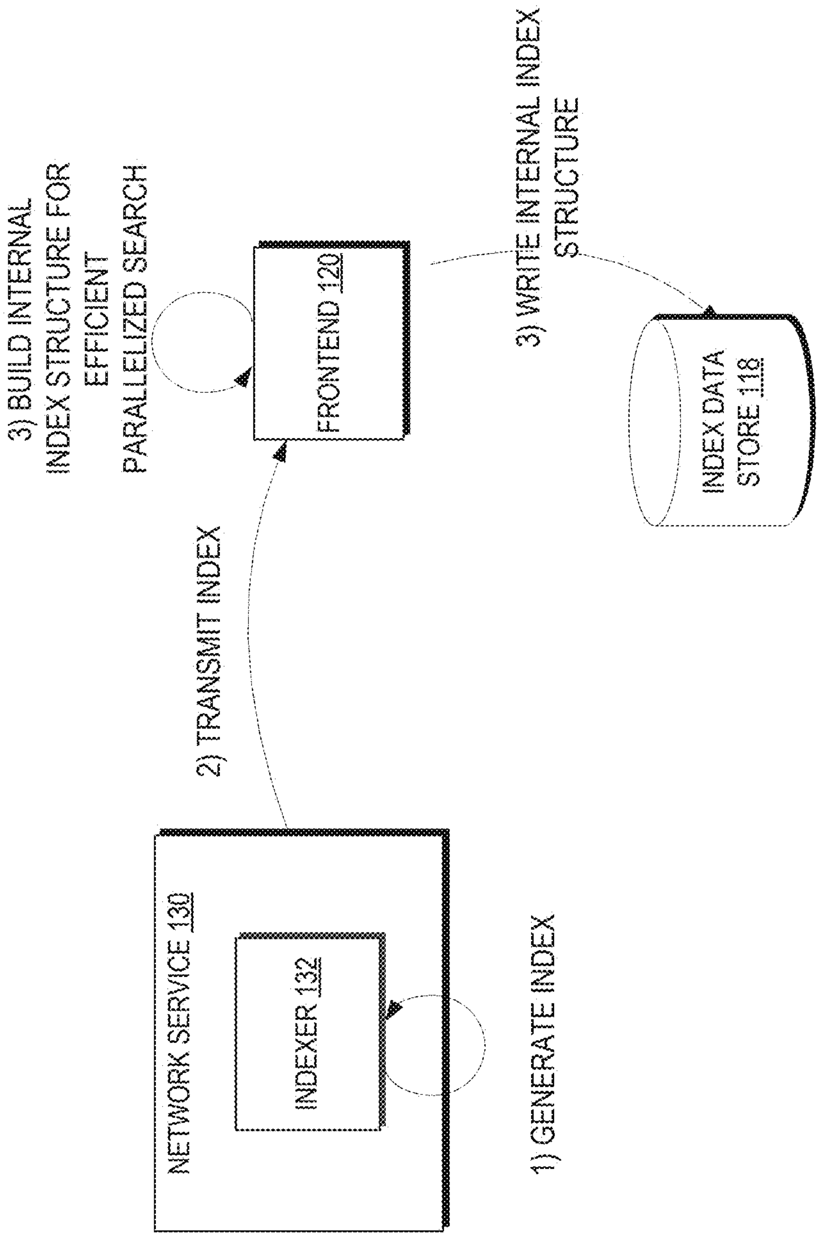
FIG. 2 illustrates interactions for ingestion of indexes from the network services of FIG. 1 into the index search system of FIG. 1.

With reference to FIG. 2, illustrative interactions will be described for ingestion of indexes from network services 130 into the index search system 112. The interactions begin at (1), where an indexer 132 of the network service 130 generates an index for data of the network service 130. The specific mechanism for generation of an index may vary according to the network service 130. However, in general, an index as described herein correlates individual data objects of the network service 130 with information or attributes of the individual data object such that a later search can specify such information or attributes as search criteria to locate the individual data object from the index. In some cases, the information or attributes are object metadata. For example, in the case of object storage, an index may specify object names, sizes, creation times, modification times, or the like. In some cases, the information or attributes are object data. For example, in the case of document storage, an index may identify keywords or terms in a document such that the document can be located based on such terms as specified within search criteria. The index illustratively links object attributes or information to identifying information for the data object, such as a storage location of the data object (e.g., on the network service 130 or elsewhere) or a unique identifier of the data object. As discussed above, indexes may be non-incremental and thus not depend on a prior index, or may be incremental and thus reflect changes to a dataset since a prior point in time. Each index may therefore be associated with metadata regarding the index, such as identification of the dataset to which the index pertains, a time of creation of the index, or the like. In one instance, an index is created concurrent with a backup of a dataset. For example, a copy of a dataset may be generated as a point-in-time backup of the dataset, and the index may identify data objects within the point-in-time backup for later identification.

After generation of the index, the indexer 132 transmits the index to the frontend 120 of the index search system 112 at (2). Thereafter, the frontend 120 builds, from the index, an internal index structure facilitating efficient parallelized searches. For example, where different network services 130 provide indexes using different formats, the frontend 120 may convert such different formatted indexes into a common format. In one embodiment, building the internal index structure may include converting fields of an index to a common field representation. For example, different services 130 may utilize different terms for similar or the same concept (e.g., "last edit time" and "last modified time" or "file name" and "object name"), and the frontend 120 may thus convert such fields into a common unified structure to enable searching across indexes of different services 130. Illustratively, each service 130 may register with the index search system 112 prior to ingestion of indexes to map service-specific field names to shared field names for purposes of conversion.

Figure 3:
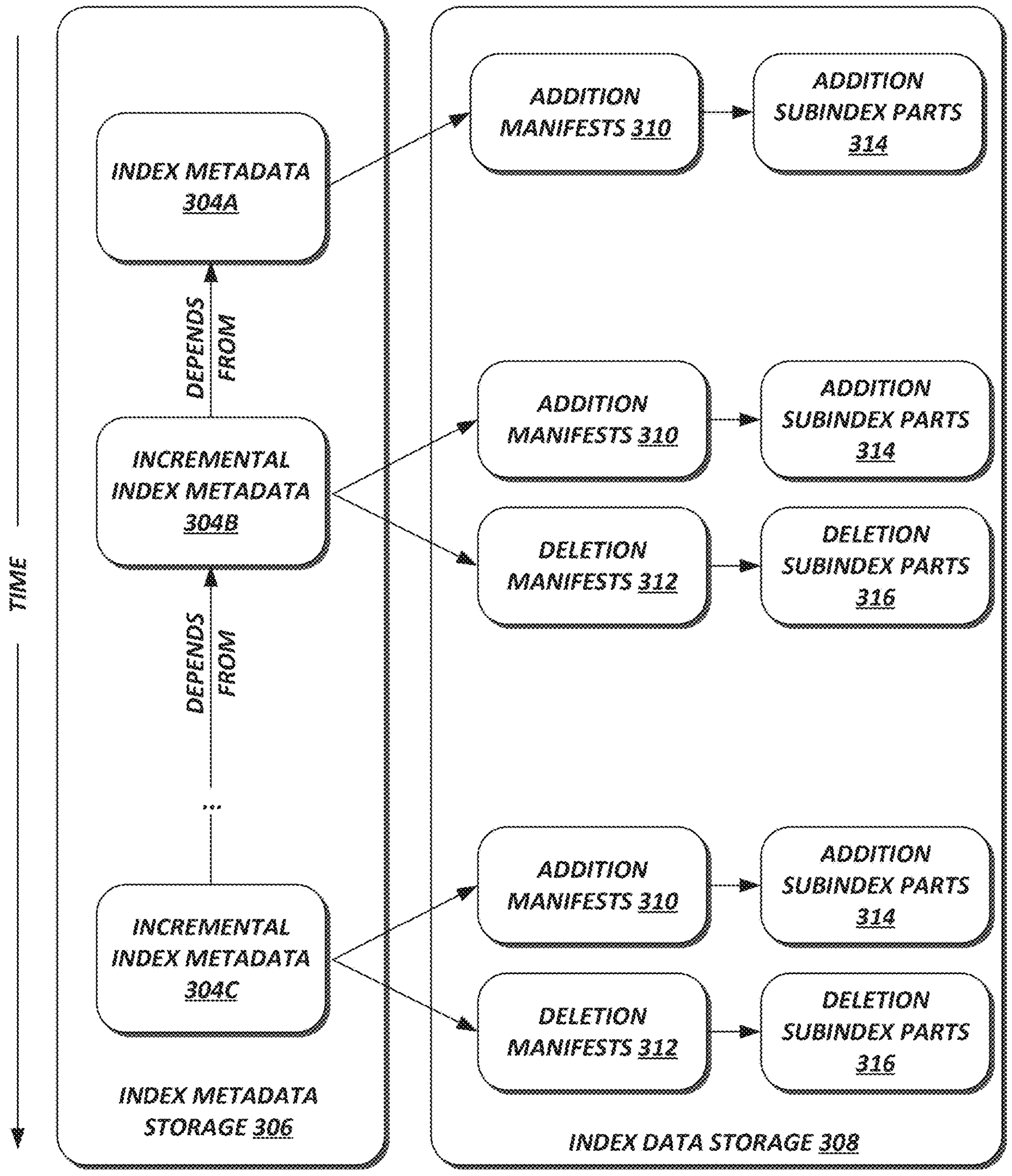
FIG. 3 depicts an example internal index structure usable by the index search system of FIG. 1, showing index metadata, subindex manifests, and subindex parts.

In addition, the internal index structure of the index search system 112 may be modified relative to the index structure of the network service 130 to facilitate highly parallelized search. One example of such an internal index structure is shown in FIG. 3. As shown in FIG. 3, each index includes three types of data: index metadata 304, subindex manifests 310 and 312, and subindex parts 314 and 316. The subindex manifest 310 and 312 and parts 314 and 316 are further divided into distinct manifests and parts for additions (references 310 and 314) and manifests and parts for deletions (references 312 and 316). Index metadata 304 is illustratively stored in index metadata storage 306, which may for example be a database optimized for rapid retrieval. Subindex manifests 310 and 312 and subindex parts 314 and 316 is illustratively be stored in index data storage 308, which may for example be an object storage system facilitating storage of a large number of distinct data objects.

Index metadata 304 illustratively stores metadata regarding the index, such as identification of the dataset or network service to which the index pertains, a time of creation of the index, or the like. Index metadata 304 can further indicate a dependency among indexes. For example, as shown in FIG. 3, index metadata 304A does not depend on a distinct index, and therefore represents a "full" or non-incremental index. Index metadata 304B and 304C depend from a prior point-in-time index, and thus are incremental indexes. The indexes thus form a chain of temporally linked indexes.

Index metadata 304 further points to one or more addition subindex manifests 310 and (in cases of incremental indexes) one or more deletion subindex manifest 312. Each manifest illustratively identifies corresponding subindex parts (the addition subindex parts 314 in the case of the addition subindex manifest 310 and the deletion subindex parts 316 in the case of the deletion subindex manifests 312. Subindex parts illustratively include a portion of the index data—that is, subindex parts map individual data objects to attributes or information of the data object such that data objects may be located by specification of the attributes or information. For example, where a given addition subindex is broken into 1000 addition subindex parts 314, ten distinct addition manifests 310 may be generated for the index, each of which identifies 100 of the addition subindex parts 314. By using the three tiered reference mechanism of FIG. 3, a given index may be broken into a very high number of parts, without overwhelming any individual storage system. For example, the index metadata storage 306 may be limited in the length of a given entry of index metadata 304, such that it cannot reference more than n subindex parts directly. The inclusion of manifests therefore enables the metadata 304 to reference a smaller number of manifests that in turn reference parts, enabling a very high number of parts to be referenced. In some instances, more than three tiers of reference indirection may be used. In other instances, manifests may be omitted and parts may be directly referenced within metadata. In still other instances, metadata and parts may be combined such that an index is stored as a single data object.

As discussed above, efficient searching of indexes is facilitated by division of each index into addition and deletion subindexes (represented by respective manifest and parts), which respectively identify addition of objects relative to a prior index from which a given index depends (if any) and deletion of objects relative to that prior index. Notably, separation of an index into addition and deletion subindexes enables highly parallelized search across multiple interdependent indexes, without requiring sequential searching of distinct indexes. In some instances, an index as provided by a network service 130 identifies additions and deletions relative to a dependency index. In other instances, the index search system 112 identifies additions and deletions based on a comparison between a given index and a past dependency index. For example, each index may identify a set of data objects in a dataset, and additions may be determined by identifying data objects in a temporally newer index not included within a temporally older index. Deletions may be determined by identifying data objects in a temporally older index not included within a temporally newer index. As noted above, modifications are illustratively represented as both a deletion (of a past version of the object) and an addition (of a new version of the object).

In some cases, it may be desirable to limit a length of an index chain. For example, processing of a chain above a threshold number of indexes or over a threshold period of time may require significant computing resources and provide minimal or no benefit. Accordingly, in some embodiments the index search system 112 may be configured to compact index chains to reduce an overall length of the chain (e.g., when a time duration or a quantitative length of the chain exceeds a threshold). Illustratively, the index search system 112 may generate a single base index at a given point in time from a base index and one or more incremental indexes prior to that point in time, such as by aggregating objects within deletion subindexes and subtracting items according to deletions indicated within the deletion subindexes. This can enable the index search system 112 to "compact" index chains and reduce a length of such chains.

Returning to the interactions of FIG. 2, on building the internal index structure from an obtained index, the frontend 120 writes the internal index structure to the index data store 118. As discussed in more detail below, the stored internal index structure can thereafter be utilized to conduct highly parallelized searching of multiple indexes for relevant data objects.

Figure 4A:
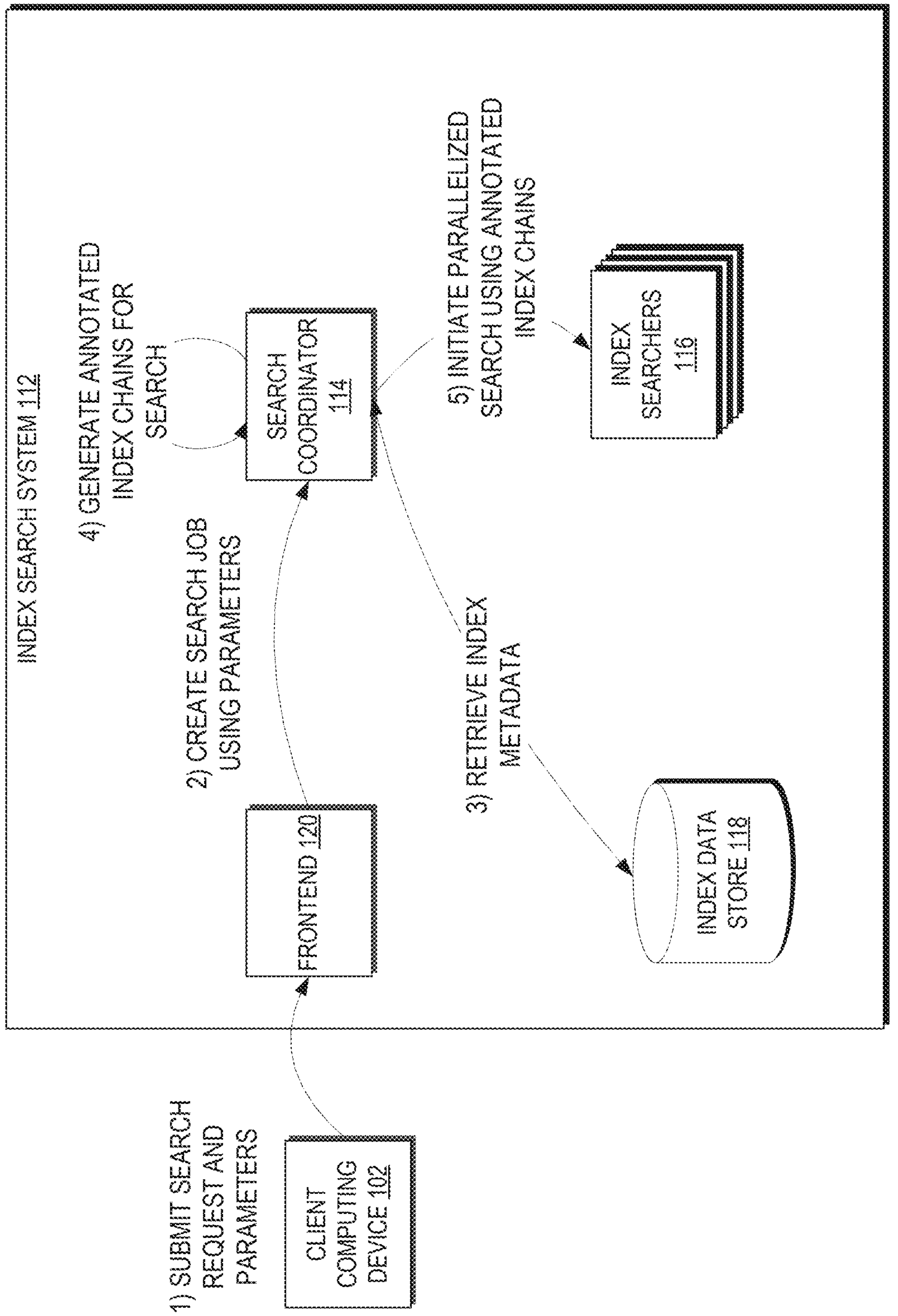
FIGS. 4A-4B illustrate interactions for conducting a parallelized search using the index search system of FIG. 1, including coordination by the search coordinator and execution by index searchers.

With reference to FIG. 4A, illustrative interactions will be described for conducting a parallelized search against indexes using the index search system 212 in accordance with embodiments of the present disclosure. For example, the interactions of FIG. 4A may occur subsequent to those of FIG. 2, discussed above—that is, after one or more indexes from network services 130 have been ingested into the index search system 112.

The interactions of FIG. 4A begin at (1), where a client computing device 102 submits to the frontend 120 a search request and search parameters. For example, the frontend 120 may provide to the client computing device 102 an interface (e.g., a GUI) enabling specification of the request and parameters. The request parameters may include, for example, identification of one or more indexes or one or more datasets corresponding to indexes. As an illustration, where each index corresponds to a point-in-time backup of a dataset, the request may specify the dataset (or multiple datasets) and one or more point-in-time backups of that dataset to search. In the case of incremental indexes, specification of an index within the search parameters (or other information corresponding to an index, such as the dataset and a point-in-time to which the index pertains) can represent specification of both a terminal incremental index and the prior point-in-time indexes from which the terminal incremental index depends. The request further specifies parameters for the search, which can include both criteria for objects responsive to the search (e.g., as field values for fields in the index) and metaparameters, such as a total number of results, a total search time, or the like.

On obtaining a search request and parameters, the frontend 120 initiates a search job on the search coordinator 114 using the parameters. The search coordinator 114 illustratively acts to coordinate individual index searches by index searchers 116. As noted above, a straightforward approach to searching may be to simply search every index corresponding to the search parameters. However, where indexes are incremental, such an approach can lead to significant duplication of work, because each terminal incremental index associated with a search depends on prior indexes, which may overlap between different terminal indexes. For example, where a search specifies that backups of a dataset over the course of a week are to be searched, each day may refer back to each prior day within the week, such that searching for example the Tuesday backup requires searching the Monday backup. Thus, directly searching each index (and therefore each dependency index) results in significant duplication of work. However, attempting to merely search a final index in a point-in-time series is also problematic. For example, satisfying a search for objects existing over the course of a week merely by searching an index corresponding to a final day in the week (e.g., when the final day index depends on all indexes for all prior days) may exclude objects deleted over the course of the week. Illustratively, assume a file existed on day 2 of the week satisfying the search criteria but was deleted on day 3. Attempting to deduplicate searching by solely searching a final index in the week would exclude such a file, as the file was deleted at the time of creation of the final index.

To address this problem, embodiments of the present disclosure enable a search coordinator 114 to determine a reduced (e.g., minimum) index chain or set of index chains to search to satisfy search parameters, which reduced index chain or set of index chains omits duplicative indexes. Moreover, the search coordinator 114 can be configured to annotate indexes within the index chain (or set thereof) with the points-in-time for which each index should be considered for purposes of a search. Such annotation enables the reduced chain to be searched without omitted items that may have been deleted within the index chain, thus avoiding the problems described above.

Figure 5:
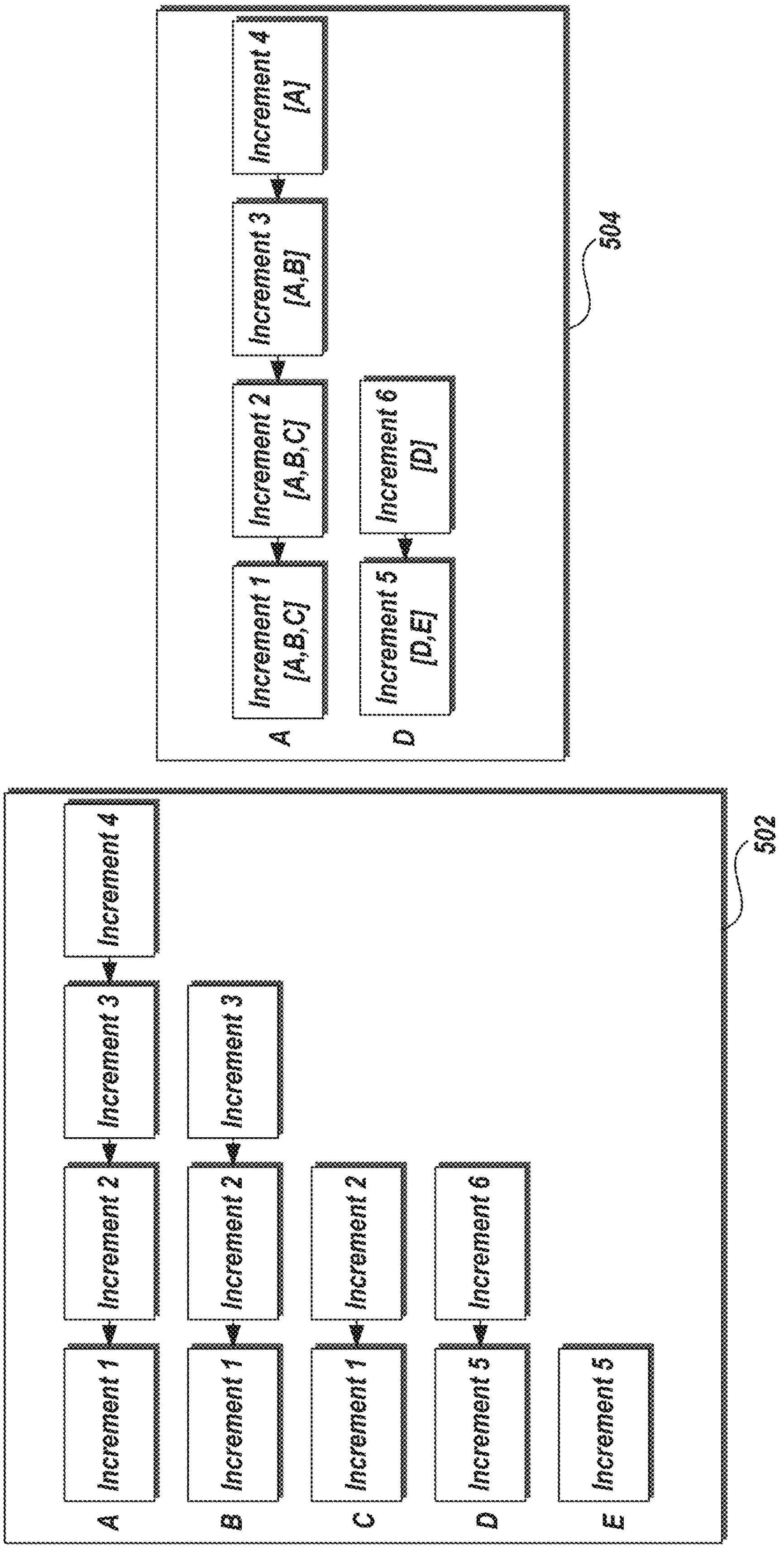
FIG. 5 visually depicts how a reduced index chain may be generated from multiple overlapping index chains, as performed, e.g., by the search coordinator of FIG. 1.

The process of identifying a reduced index chain or set thereof is visually depicted in FIG. 5. Specifically, FIG. 5 depicts a first set of non-deduplicated index chains 502, and a reduced set of index chains 504 corresponding to the set 502 after reduction. In FIG. 5, each index chain A-E of the first set 502 is implicated within search parameters. For example, the terminal index of each chain (e.g., increment 4 for chain A, increment 3 for chain B, etc.) may correspond to a point-in-time index for a dataset. Each chain is formed by identifying the terminal index based on search parameters (e.g., specification of a dataset and a point in time) and identifying one or more past indexes on which the terminal index depends. For example, FIG. 5 depicts increment 4 depending on increment 3, increment 3 depending on increment 2, etc. Each terminal index illustratively identifies a particular backup of one or more datasets, which backup was specified within search parameters. However, as can be seen in FIG. 5, the respective chains in the non-deduplicated set 502 include substantial overlap, such that searching chain A for data would require searching all indexes of chain B and C. Of course, data may be modified via later indexes within an index chain, and as such a search of chain A may not return identical results as a search of chain B, despite this overlap. Thus, a naïve approach to searching the index chains 502 either results in duplication of effort or potential oversight of search results.

The reduced set of index chains 504 addresses this problem by deduplicating the chains 502 and annotating individual indexes within each chain with the index chain (or chains) to which they pertain. Because indexes within the reduced set of index chains 504 are derived from the unreduced chains 502, such indicates may be referred to herein as derivative indexes. For example, annotated index chain A of the reduced set 504 indicates that increments 1 and 2 are included within index chains A-C of the unreduced set 504, increment 3 is included within index chains A-B of the unreduced set 504, and increment 4 is included within index chain A of the unreduced set 504. Similar annotations are shown for annotated index chain B. As discussed below, this annotation enables efficient parallelized searching of increments without duplication of effort. Specifically, a device may review an index increment for data objects matching search parameters when the index is considered as part of the chain identified in the annotations for the increment (e.g., with the modifications to a dataset indicated by subsequent increments in the chain).

Returning to description of FIG. 4A, on obtaining a search job and corresponding parameters, the search coordinator 114 therefore obtains index metadata from the index data store 118. The index metadata may include for example information relating the search parameters to one or more index chains (e.g., mapping one or more datasets and points in time in the search parameters to one or more index chains, each of which includes a set of indexes). The coordinator 114 can thereafter identify index chains associated with the search, and at (4) generate annotated index chains for the search by deduplicating the index chains and annotating individual indexes in the chains with the chains for which they are to be searched, as depicted in FIG. 5.

At (5), the search coordinator 114 then initiates a parallelized search using the annotated index chains by instructing index searchers 116 to initiate searches across the indexes of the annotated chains. In some embodiments, the search coordinator 114 is configured to determine a degree of parallelization for a search based on parameters such as a desired search speed or amount of resources to utilize for the search and an amount of available resources (e.g., a number of index searchers 116 available). As discussed above, embodiments of the present disclosure can support very high levels of parallelization. In one embodiment, the level of parallelization is equal to the number of indexes in the annotated index chains. In other embodiments, the level of parallelization is greater to or less than the number of indexes. In still other embodiments, no parallelization is implemented, and searching is conducted by a single index searcher 116.

Figure 4B:
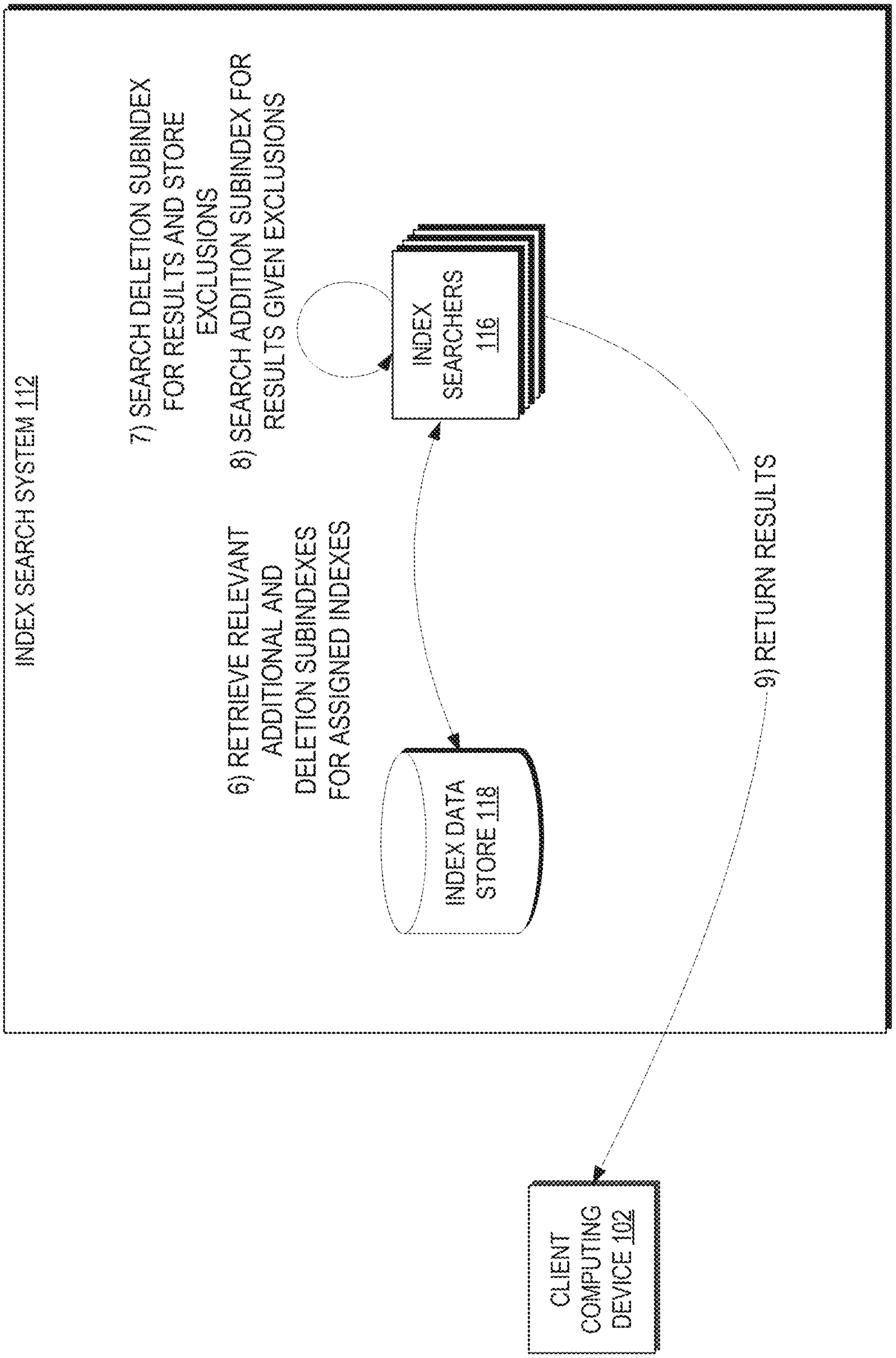

The interactions of FIG. 4A are continued in FIG. 4B, which depicts operations of index searchers 116 to search indexes and provide results to a client computing device 102. Specifically, the interactions continue at (6), where the index searchers 116 retrieve relevant additional and deletion index parts for assigned indexes. As noted above, searching may occur by index searchers 116 operating in parallel, with minimal coordination among searchers 116. For purposes of example, it will be assumed that each index searcher 116 is assigned to search a single index (incremental or not) associated with search parameters. However, in some embodiments a given searcher 116 may be assigned multiple indexes.

As discussed above, such as with respect to FIG. 3, a given index can be stored in accordance with embodiments of the present disclosure as an addition subindex and a deletion subindex (which may be omitted for non-incremental indexes). Accordingly, interaction (6) can include obtaining the addition and deletion subindexes of those indexes to which they have been assigned (e.g., as indicated by index metadata stored within the store 118, such as in the format discussed with respect to FIG. 3). In general, significant parallelization and minimal coordination may be achieved by configuring the searchers 116 to search deletion subindexes prior to searching addition subindexes. While searching of deletion subindexes may be counterintuitive (as such indexes record the deletion of files, and thus do not directly store information relevant to many searches), such searching enables searchers 116 to accurately determine search results are to be excluded from searches of other indexes that depend on the index corresponding to the deletion subindex.

Figure 6:
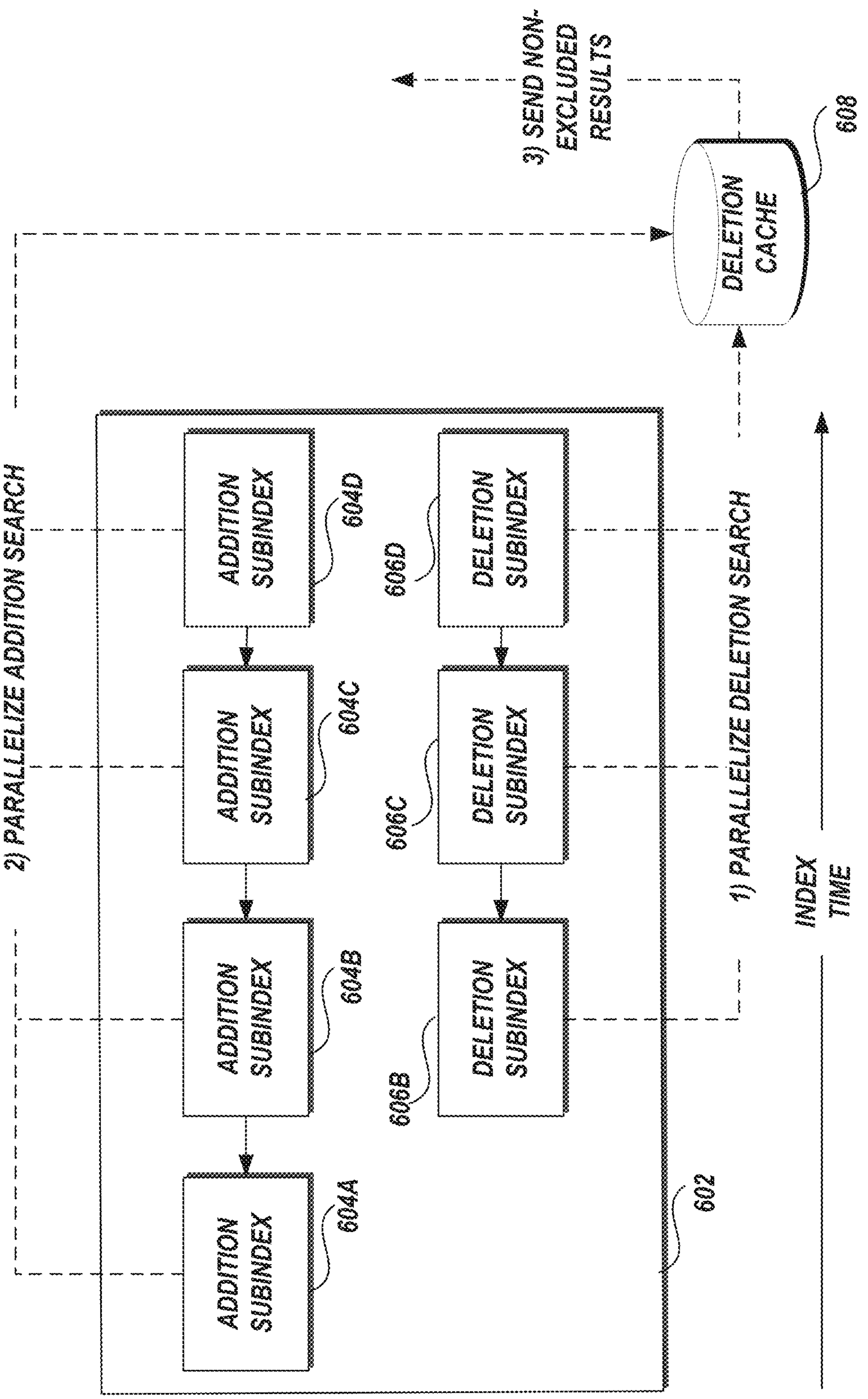
FIG. 6 illustrates how the index searchers of FIG. 1 operate in parallel to search a given index chain using deletion and addition subindexes.

This process of utilizing deletion and addition subindex searching to enable parallelization of operation of searchers 116 is illustrated in FIG. 6. Specifically, FIG. 6 depicts how multiple searchers 116 may act in parallel to search a given index chain 602. While FIG. 6 depicts a single index chain 602, a search may involve searching across multiple index chains. However, because different index chains may not include any relationship to one another, searching across different index chains may not require any coordination among searchers 116 for those different chains.

As shown in FIG. 6, the chain 602 includes multiple indexes, referred to herein as indexes A-D. Each index includes an addition subindex 604 (respectively 604A-D, corresponding to indexes A-D). In addition, indexes B-D are incremental, and thus depend on a prior-in-time index, as shown in FIG. 6 (e.g., where index B depends on index A, index C depends on index B, etc.). Accordingly, each of indexes B-D include a deletion subindex 606.

As discussed above, while the totally of a dataset may be reflected in an index chain, the dataset may be modified to delete data after a given point point-in-time. Such deletions are thus reflected in a deletion subindex for that given point-in-time. Accordingly, searching of deletion subindexes 606 can enable an index searcher 116 to determine whether a deletion should exclude a search result from a search of an incremental index. For example, assume that search parameters indicated that index D should be searched for a given file. Further assume that the file is identified as added in subindex 604B, corresponding to index B. A naïve search of index D may identify the file, based on index D's (indirect) dependency on index B. However, if the file was deleted at the time of index C (and thus identified in deletion subindex C), an index searcher 116 searching index D could be made aware of such deletion, and therefore exclude the file from results. On the other hand, a search of index B (which would entail searching the same addition index 604B) would not exclude such a file, because the dataset represented by index B is from a point in time prior to the time of index C.

Accordingly, in FIG. 6, index searchers 116 initially conduct a search of deletion indexes 606B-C for data objects that match search criteria. Notably, such searching may occur in parallel, without requiring coordination among index searchers 116. Results, if found, can be stored in a deletion cache 608 (e.g., forming part of the index data store 118 or other storage accessible to the index searchers 116). Each result may indicate one or more data objects responsive to a search, and the index (or deletion subindex) in which the result was located.

Thereafter, the index searchers 116 conduct a similar search of addition subindexes 604A-604D. As noted above, the index chain 602 can be annotated to indicate a particular terminal index that each index A-D is to be searched with respect to. Accordingly, on identifying an object within a given index (e.g., as responsive to or satisfying search criteria), an index searcher 116 can determine whether the object is identified within the deletion cache 608 and, if so, the index at which the object was deleted. If the present index is being searched with respect to a terminal index matching or exceeding the index at which the object was deleted, such object can be deleted from search results. Otherwise, the object can be included. For example, assume a file was created at index A and deleted at index D. Any search made with respect to index C or D would exclude the file (as index C or D are the terminal indexes of such search), while a search of index A or B may include the file (if responsive to search criteria). Notably, however, independent searches of each of indexes A-D would implicate significant overlap in effort, as each later index would require searching of prior indexes on which the later depends. By virtue of the operations of FIG. 6, such overlapping effort can be avoided.

Accordingly, after comparison of search results from the search of addition subindexes, index searchers 116 can transmit non-excluded results to a destination, such as a client computing device 102 or a storage location accessible to the client computing device 102.

Returning to the description of FIG. 4B, the index searchers 116 accordingly, at (7), search respective deletion subindexes for exclusions to the search and store the exclusions as described above. Thereafter, at (8), the index searchers 116 search addition subindexes for results given the exclusions. The results are then provided to or otherwise made available to the client computing device 102 (e.g., by storage in a network storage location accessible to the client computing device 102). In one embodiment, such results are transmitted in a streaming fashion, such that initial results are transmitted or otherwise made available prior to all searching being completed.

While FIGS. 4B and 6 depict the parallelized addition search as subsequent to the parallelized deletion search, in some instances these two searches may also occur in parallel. Thereafter, the index searchers 116 may compare results of both searches to excluded results in the manner described above before non-excluded results are transmitted.

Figure 7:
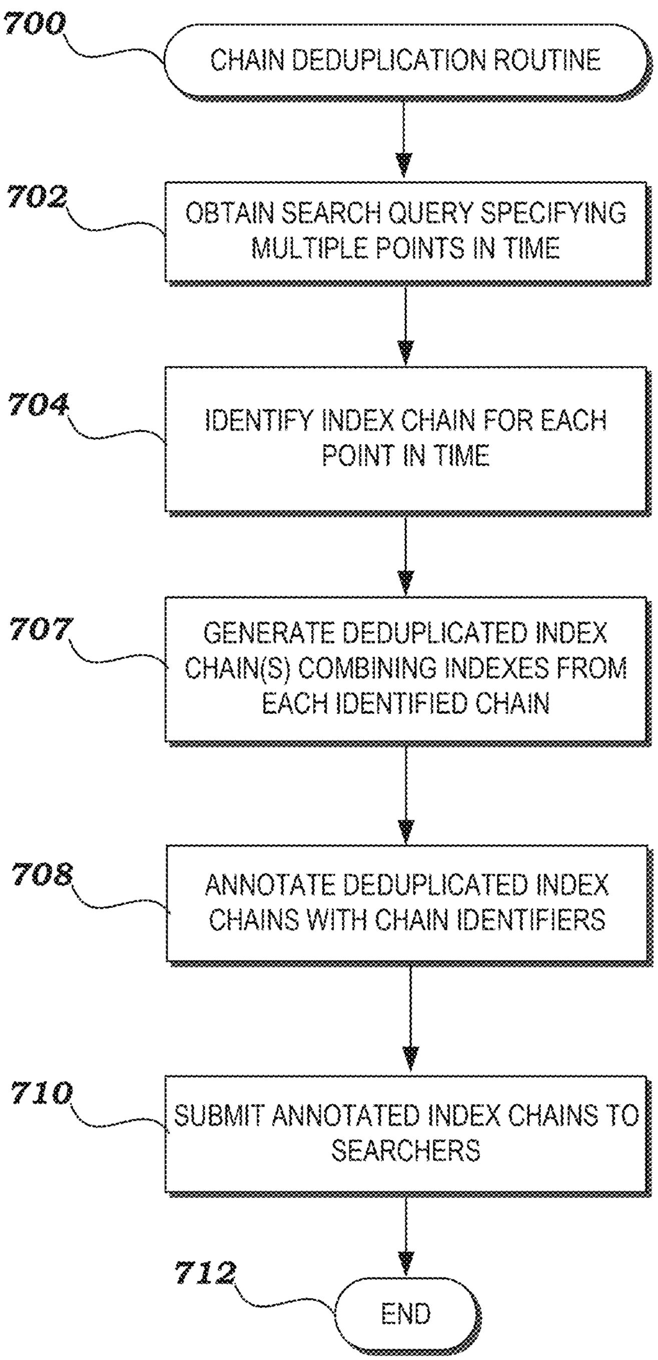
FIG. 7 depicts an illustrative routine for implementing chain deduplication, as performed, e.g., by the search coordinator of FIG. 1.

FIG. 7 depicts an illustrative routine 700 for implementing chain deduplication in accordance with embodiments of the present disclosure. The routine 700 may be implemented, for example, by the search coordinator 114 of the index search system 112 of FIG. 1. As discussed above, the search coordinator 114 illustratively represents a computing device configured to identify a minimum set of index chains to search based on search parameters and to coordinate individual index searches by index searchers 117.

The routine 700 begins at block 702, where the search coordinator 114 obtains a search query specifying multiple points in time to be searched. The search query illustratively includes search criteria for identifying relevant data objects, multiple points in time to be searched, and identification of one or more datasets corresponding to the search. For example, the search query may specify a particular dataset and multiple points in time at which the dataset should be searched, such as daily backups of the dataset over a period of time (e.g., a week, month, or year). Each point in time illustratively corresponds to one or more indexes, such as a non-incremental index identifying data objects of the dataset at that point in time, or an incremental index and one or more dependency indexes that collectively identify data objects of the dataset at that point in time.

At block 704, the search coordinator 114 identifies index chains for each point in time specified within the search query. As noted above, each point in time can correspond to an index chain that includes a terminal incremental index and one or more prior point-in-time indexes from which the terminal incremental index depends. For example, where a search specifies that backups of a dataset over the course of a week are to be searched, each day may correspond to an index chain that refers back to each prior day within the week. Illustratively, a Tuesday backup may correspond to an index chain including a base index for Monday and an incremental index for Tuesday, while a Wednesday backup may correspond to an index chain including the base index for Monday, the incremental index for Tuesday, and an incremental index for Wednesday. As can be appreciated, such index chains include substantial overlap, such that independently searching each index chain results in significant duplication of effort.

Accordingly, at block 706, the search coordinator 114 generates deduplicated index chains by combining indexes from each identified chain while eliminating duplicative indexes. The deduplicated index chains illustratively represent a minimum set of indexes that collectively represent the first and second chains of indexes without duplication within the set of incremental indexes. Continuing the example above, where a search specifies that backups of a dataset over the course of a week are to be searched, the search coordinator 114 may generate a deduplicated index chain corresponding to 7 indexes: a base index for day one and an incremental index for each additional day. By virtue of using the deduplicated index chain, the total number of indexes to be searched when searching across multiple representations of a data set at multiple points in time can be drastically reduced. For instance, a basic approach to searching 7 days of backups would require searching 28 indexes (7+7+5+4+3+2+1), while the deduplicated approach requires searching only 7 indexes.

At block 708, the search coordinator 114 annotates the deduplicated index chains with chain identifiers indicating which original index chains (and thus which points in time) each index should be searched with respect to. Such annotation is illustratively required to avoid overlooking objects that would be missed when searching an index solely with respect to a later point in time. For example, using the 7-day search illustration, an index corresponding to the first day may be annotated with an indication that it should be searched with respect to backups for days 1-7, an index corresponding to the second day may be annotated with an indication that it should be searched with respect to backups for days 2-7, and so forth.

Such annotations enable a search system to avoid overlooking objects that might have been modified or deleted during one of the time periods being searched. For example, assume an object responsive to a search is indicated in an index for the first day, but is deleted on the second day. If the index of the first day were searched solely as part of an index chain for the 2nd (or any later) day, the search would not identify the object, as the object is indicated as deleted at the relevant time point of the search. However, because the first day index is annotated to be searched both with respect to the first day and subsequent days, a search process can determine that the object should not be excluded from results for the first day, despite being excluded from results for subsequent days.

At block 710, the search coordinator 114 submits the annotated index chains to index searchers 117 for execution of the search. For example, the coordinator may identify a number of searchers 117 to utilize to search distinct indexes within the chain in parallel. As discussed above, the search coordinator 114 may determine a level of parallelization for the search based on various factors, such as a priority of the search, a number of indexes to be searched, a size of the indexes to be searched, a number of index searchers 117 available, or resources of index searchers 117 available. The annotated index chains enable the index searchers 117 to conduct highly parallelized and accurate searching across the indexes for data objects responsive to the search, as described in more detail with respect to other figures herein.

The routine 700 then ends at block 712, having successfully converted multiple overlapping index chains into an efficient, deduplicated representation that maintains search accuracy while significantly reducing computational overhead.

Figure 8:
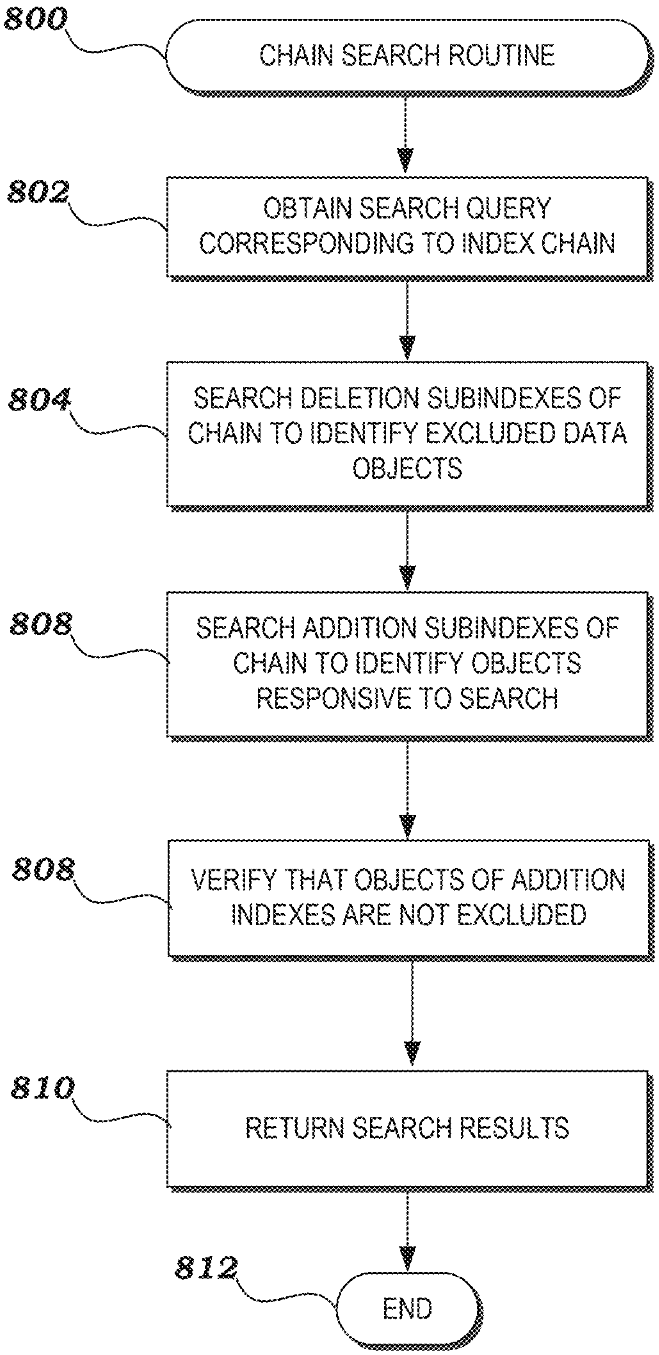
FIG. 8 depicts an illustrative routine for implementing parallelized searching of incremental indexes, as performed, e.g., by the index searchers of FIG. 1.

FIG. 8 depicts an illustrative routine 800 for implementing parallelized searching of incremental indexes in accordance with embodiments of the present disclosure. The routine 800 may be implemented, for example, by the index searchers 116 of the index search system 112 of FIG. 1, working in coordination with the search coordinator 114 to conduct highly parallelized and accurate searching across indexes for data objects responsive to a search query.

The routine 800 begins at block 802, where the system obtains a search query corresponding to an index chain. The search query illustratively includes search criteria for identifying relevant data objects, one or more points in time to be searched, and identification of one or more datasets corresponding to the search. As discussed above, the search query may specify a particular dataset and multiple points in time at which the dataset should be searched, such as daily backups of the dataset over a period of time. The index chain corresponding to the search query illustratively includes a base index and one or more incremental indexes, where each incremental index comprises an addition subindex identifying data objects added to the data set relative to a past index within the chain and a deletion subindex identifying data objects removed from the data set relative to the past index within the chain.

At block 804, the system searches deletion subindexes of the chain to identify excluded data objects. As described above with respect to FIG. 6, searching of deletion subindexes enables index searchers 116 to determine whether a deletion should exclude a search result from a search of an incremental index. Specifically, the system may perform a parallelized search of the deletion subindexes for the plurality of incremental indexes to identify excluded data objects, where individual data objects of the excluded data objects satisfy the search criteria and are indicated within the deletion subindexes to have been deleted at a deletion point in time. The excluded data objects are illustratively stored in a deletion cache 608 accessible to the index searchers 116, with each result indicating one or more data objects responsive to the search and the index (or deletion subindex) in which the result was located. Notably, such searching may occur in parallel among multiple index searchers 116, without requiring coordination among the searchers 116, thus enabling highly scalable searching.

At block 806, the system searches addition subindexes of the chain to identify objects responsive to the search. The system performs a parallelized search of the base index and the addition subindexes for the plurality of incremental indexes to identify data objects responsive to the search query. As with deletion subindex searching, addition subindex searching may occur in parallel among multiple index searchers 116. The addition subindex illustratively reflects objects added to a dataset relative to a prior point in time, as well as information regarding such objects that may be matched against search criteria. A non-incremental base index may be represented solely as an addition subindex, such that the addition subindex reflects the addition of all objects relative to a null set.

At block 808, the system verifies that objects identified in the addition indexes are not excluded by the deletion cache. Specifically, to search the addition subindexes, the system searches an individual addition subindex with respect to the at least one point in time to be searched, identifies within the individual addition subindex a data object satisfying the search criteria, and verifies that the data object is not identified within the excluded data objects as having been deleted prior to the at least one point in time to be searched. As noted above, the index chain can be annotated to indicate a particular terminal index that each index is to be searched with respect to. Accordingly, on identifying an object within a given index as responsive to or satisfying search criteria, an index searcher 116 can determine whether the object is identified within the deletion cache and, if so, the index at which the object was deleted. If the present index is being searched with respect to a terminal index matching or exceeding the index at which the object was deleted, such object can be excluded from search results. Otherwise, the object can be included in the search results. Verification that an object identified in the addition indexes is not excluded by the deletion cache may alternatively be referred to herein as filtering of objects in the addition indexes using the deletion cache.

At block 810, the system returns search results identifying data objects responsive to the search query that were not excluded by the verification process. The search results may be transmitted to a requesting client computing device 102 or stored in a storage location accessible to the client computing device 102. In some instances, search results are streamed to client computing devices 102, such that they are available as determined by the index searchers 116. The data identifying the data objects responsive to the search query may comprise a set of search results stored in a format matching a format of the incremental indexes, enabling subsequent searches to be performed against the search results themselves.

The routine 800 then ends at block 812, having successfully conducted a highly parallelized search across multiple incremental indexes while maintaining accuracy of search results and avoiding the computational overhead of searching overlapping index dependencies multiple times. By virtue of the parallelized approach utilizing separate deletion and addition subindex searches, the routine 800 enables constant search time regardless of the number of time periods searched, so long as a sufficient number of computing devices is available for parallelization.

In some embodiments, the level of parallelization implemented in routine 800 may be determined based on various factors, such as a priority of the search, a number of indexes to be searched, a size of the indexes to be searched, a number of index searchers 116 available, or resources of index searchers 116 available. The routine 800 is highly scalable and may support parallelization across an extremely high number of indexes and data objects, enabling efficient searching of datasets with billions or trillions of entries.

In the above descriptions of FIGS. 7 and 8, the blocks described can include alternate implementations within the scope of the example embodiments of the present disclosure in which the blocks can be executed out of order from that shown or discussed, including substantially concurrently or in reverse order, depending upon the functionality involved, as would be understood by those skilled in the art.

Figure 9:
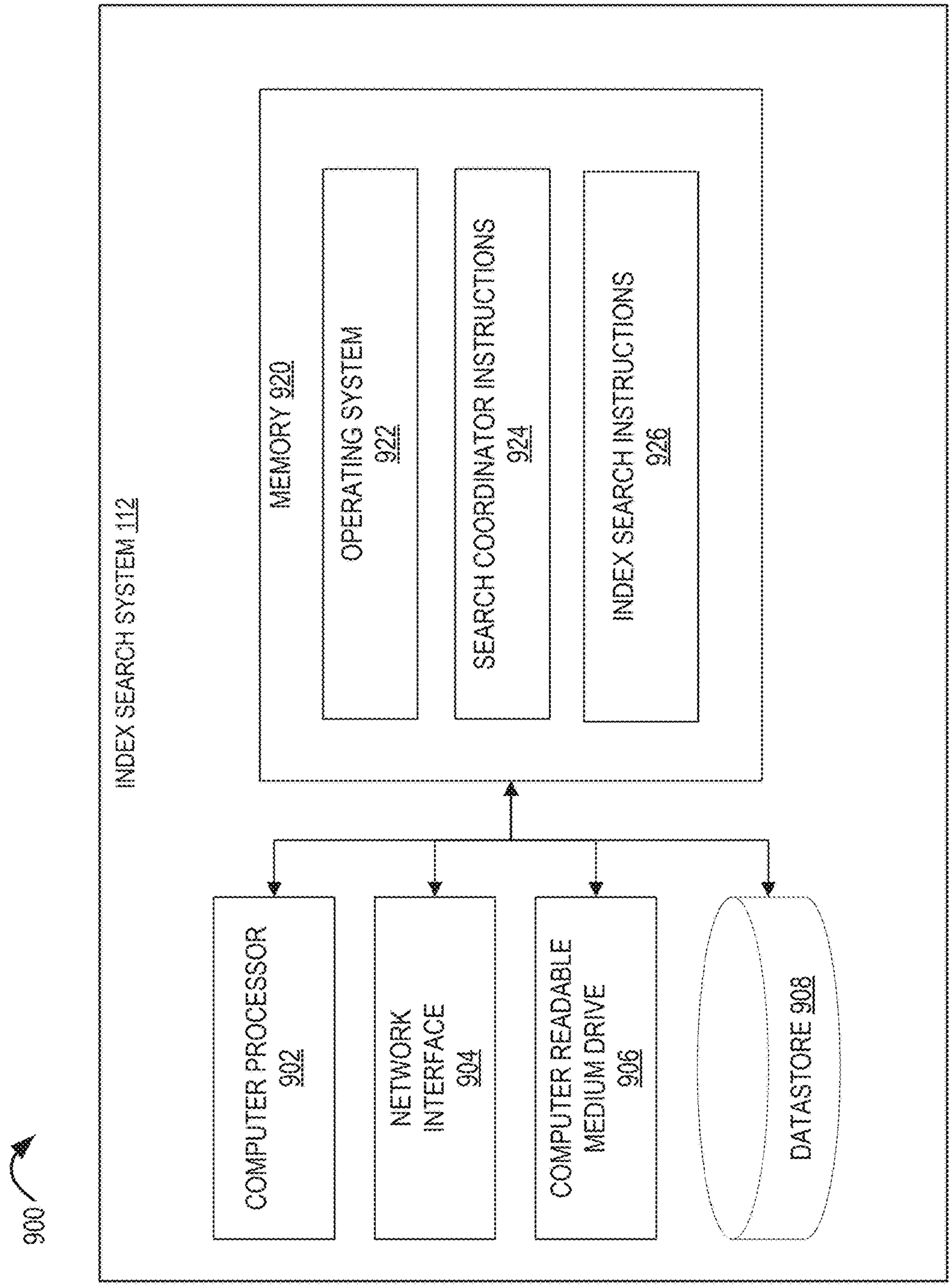
FIG. 9 illustrates various components of an example computing device configured to implement various functionalities as disclosed herein.

FIG. 9 illustrates various components of an example computing device 900 configured to implement various functionality of a machine learning system 212. In some embodiments, as shown, the machine learning system 212 may include: one or more computer processors 902, such as physical central processing units ("CPUs"); one or more network interfaces 904, such as a network interface cards ("NICs"); one or more computer-readable medium drives 906, such as a high density disk ("HDDs"), solid state drives ("SSDs"), flash drives, and/or other persistent non-transitory computer-readable media; one or more datastore 908, such as physical storage and/or remote storage, and/or other data storage components; and one or more computer-readable memories 920, such as random access memory ("RAM") and/or other volatile non-transitory computer-readable media.

The computer-readable memory 920 may include computer program instructions that one or more computer processors 902 execute in order to implement one or more embodiments. The computer-readable memory 920 can store an operating system 922 that provides computer program instructions for use by the computer processor(s) 902 in the general administration and operation of the clustering system 518. In some embodiments, the computer-readable memory 920 can further include computer program instructions and other information for implementing aspects of the present disclosure. For example, the computer-readable memory 920 may search coordinator instructions 924 for implementing search coordination, such as identification, deduplication, and annotation of index chains related to a search query and index search instructions 926 for efficient, parallelized searching of index chains, as described herein. When a routine is initiated, a corresponding set of executable program instructions stored on a computer-readable medium drive 906 may be loaded into computer-readable memory 920 and executed by one or more computer processors 902. In some embodiments, a routine—or portions thereof—may be implemented on multiple computing devices and/or multiple processors, serially or in parallel.

All of the methods and jobs described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and jobs may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method (including computer-implemented method), process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for efficient searching incremental indexes representing data at multiple points in time, the system comprising:

a data store storing information identifying a plurality of representations of a data set, each representation of the plurality of representations representing the data set at a distinct point in time, and each representation of the plurality of representations corresponding to a chain of indexes for the representation, the chain including a base index and one or more incremental indexes dependent on the base index;

one or more processors configured to:

obtain a search query indicating search criteria, a first point in time to be searched, and a second point in time to be searched;

identify, from information in the data store, a first chain of indexes representing the data set at the first point in time and a second chain of indexes representing the data set at the second point in time, the first and second chain of indexes sharing a shared base index;

generate a deduplicated index chain comprising derivative indexes, the derivative indexes including the shared base index and a set of incremental indexes collectively representing the first and second chains of indexes without duplication within the set of incremental indexes;

annotate a first subset of derivative indexes within the deduplicated index chain to indicate derivation from the first chain of indexes and a second subset of derivative indexes within the deduplicated index chain to indicate derivation from the second chain of indexes; and share the deduplicated index chain with a search system configured to search the derivative indexes within the deduplicated index chain for data objects satisfying the search criteria.

2. The system of claim 1, wherein an individual incremental index within the deduplicated index chain comprises: an addition subindex identifying data objects added to the data set relative to a dependency index; and a deletion subindex identifying data objects removed from the data set relative to the dependency index.

3. The system of claim 2, wherein the search system is configured to generate search results comprising the data objects satisfying the search criteria at least in part by excluding from the search results deleted data objects identified within the deletion subindex.

4. The system of claim 1, wherein the search query indicates a third point in time to be searched, and wherein the one or more processors are configured to:

identify an additional chain of indexes representing the data set at the third point in time;

incorporate the additional chain of indexes into the deduplicated index chain by including within the deduplicated index chain additional incremental indexes from the additional chain of indexes not already included in the set of incremental indexes; and annotate the additional incremental indexes with indications of which chains include the additional incremental indexes.

5. A computer-implemented method comprising:

obtaining a search query indicating search criteria, a first point in time to be searched, and a second point in time to be searched;

identifying a first chain of indexes representing a data set at the first point in time and a second chain of indexes representing the data set at the second point in time, the first chain of indexes and second chain of indexes sharing a shared base index, and each of the first and second chain of indexes including one or more incremental indexes dependent on the shared base index;

generating a deduplicated index chain comprising derivative indexes, the derivative indexes including the base index and a set of incremental derivative indexes collectively representing the first and second chains of indexes without duplication within the set of incremental indexes;

annotating a first subset of derivative indexes within the deduplicated index chain to indicate derivation from the first chain of indexes as included within the first chain of indexes and a second subset of derivative indexes within the deduplicated index chain to indicate derivation from the second chain of indexes; and sharing the deduplicated index chain with a search system to enable search within the deduplicated index chain for data objects that satisfy the search criteria.

6. The computer-implemented method of claim 5, wherein the set of incremental indexes is stored as a plurality of deletion subindexes and a plurality of addition subindexes, and wherein the method further comprises, at the search system, searching the plurality of deletion subindexes in parallel prior to searching the plurality of addition subindexes in parallel.

7. The computer-implemented method of claim 6 further comprising determining a level of parallelization for searching based on at least one of: a priority of the search query, a number of derivative indexes in the deduplicated index chain, a size of the derivative indexes, or available computational resources.

8. The computer-implemented method of claim 6 further comprising, at the search system, identifying a set of excluded data objects when searching the plurality of deletion subindexes and verifying, prior to including a data object within search results for a given time period, that the data object is not identified within the excluded data objects as deleted prior to the given time period.

9. The computer-implemented method of claim 5, wherein the data set corresponds to backup data from a network-accessible service, and wherein the method further comprises receiving a service-specific index from the network-accessible services in a service-specific format and transforming the service-specific formats into a unified format associated with additional network-accessible services.

10. The computer-implemented method of claim 9, wherein transforming the service-specific formats into a unified format associated with additional network-accessible services comprises identifying an association between a field of the service-specific index and a second field of the unified format.

11. The computer-implemented method of claim 5 further comprising generating search results identifying the data objects satisfying the search query, wherein the search results are generated in a format matching a format of the deduplicated index chain.

12. The computer-implemented method of claim 11 further comprising:

obtaining a second search query requesting a search against results of the search query; and executing the search against the search results generated in the format matching the format of the deduplicated index chain.

13. One or more non-transitory computer-readable media comprising computer-executable instructions that, when executed by a computing system, cause the computing system to:

obtain a search query indicating search criteria, a first point in time to be searched, and a second point in time to be searched;

identify a first chain of indexes representing a data set at the first point in time and a second chain of indexes representing the data set at the second point in time, the first chain of indexes and second chain of indexes sharing a shared base index, and each of the first and second chain of indexes including one or more incremental indexes dependent on the shared base index;

generate a deduplicated index chain comprising derivative indexes, the comprising derivative indexes including the base index and a set of incremental derivative indexes collectively representing the first and second chains of indexes without duplication within the set of incremental indexes;

annotate a first subset of derivative indexes within the deduplicated index chain to indicate derivation from the first chain of indexes as included within the first chain of indexes and a second subset of derivative indexes within the deduplicated index chain to indicate derivation from the second chain of indexes; and share the deduplicated index chain with a search system to enable search within the deduplicated index chain for data objects that satisfy the search criteria.

14. The one or more non-transitory computer-readable media of claim 13, wherein the set of incremental indexes is stored as a plurality of deletion subindexes and a plurality of addition subindexes, and further comprising computer-executable instructions that, when executed by the search system, cause the search system to search the plurality of deletion subindexes in parallel prior to searching the plurality of addition subindexes in parallel.

15. The one or more non-transitory computer-readable media of claim 14, wherein the executable instructions, when executed by the computing system, further cause the computing system to determine a level of parallelization for searching based on at least one of: a priority of the search query, a number of indexes in the deduplicated index chain, a size of the indexes, or available computational resources.

16. The one or more non-transitory computer-readable media of claim 14 further comprising computer-executable instructions that, when executed by the search system, cause the search system to identify a set of excluded data objects when searching the plurality of deletion subindexes and verify, prior to including a data object within search results for a given time period, that the data object is not identified within the excluded data objects as deleted prior to the given time period.

17. The one or more non-transitory computer-readable media of claim 13, wherein the executable instructions, when executed by the computing system, further cause the computing system to receive a service-specific index from a network-accessible service in a service-specific format and transform the service-specific formats into a unified format associated with additional network-accessible service.

18. The one or more non-transitory computer-readable media of claim 17, wherein to transform the service-specific formats into the unified format associated with additional network-accessible services, the executable instructions, when executed by the computing system, further cause the computing system to identify an association between a field of the service-specific index and a second field of the unified format.

19. The one or more non-transitory computer-readable media of claim 13 further comprising computer-executable instructions that, when executed by the search system, cause the search system to generate search results identifying the data objects satisfying the search query, wherein the search results are generated in a format matching a format of the deduplicated index chain.

20. The one or more non-transitory computer-readable media of claim 19 further comprising computer-executable instructions that, when executed by the search system, cause the search system to:

obtain a second search query requesting a search against results of the search query; and execute the search against the search results generated in the format matching the format of the deduplicated index chain.

* * * * *